US010767485B2

(12) United States Patent
Bintz et al.

(10) Patent No.: US 10,767,485 B2
(45) Date of Patent: Sep. 8, 2020

(54) RADIAL COOLING SYSTEM FOR GAS TURBINE ENGINE COMPRESSORS

(71) Applicant: UNITED TECHNOLOGIES CORPORATION, Farmington, CT (US)

(72) Inventors: Matthew E Bintz, West Hartford, CT (US); Enzo DiBenedetto, Berlin, CT (US); Paul E Coderre, East Hampton, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 151 days.

(21) Appl. No.: 15/864,925

(22) Filed: Jan. 8, 2018

(65) Prior Publication Data

US 2019/0211683 A1 Jul. 11, 2019

(51) Int. Cl.
*F01D 5/06* (2006.01)
*F01D 5/08* (2006.01)
(Continued)

(52) U.S. Cl.
CPC ............... *F01D 5/087* (2013.01); *F01D 5/06* (2013.01); *F02C 7/141* (2013.01); *F02C 7/18* (2013.01); *F01D 11/001* (2013.01); *F01D 11/02* (2013.01); *F04D 29/321* (2013.01); *F04D 29/582* (2013.01); *F05D 2210/12* (2013.01);
(Continued)

(58) Field of Classification Search
CPC .......... F01D 5/087; F01D 5/06; F01D 11/001; F01D 11/02; F02C 7/141; F02C 7/18; F05D 2210/12; F05D 2220/3218; F05D 2220/3219; F05D 2240/55
See application file for complete search history.

(56) References Cited

U.S. PATENT DOCUMENTS 5,317,877 A * 6/1994 Stuart .................... F02C 7/185
60/736
6,361,277 B1 3/2002 Bulman et al.
(Continued)

FOREIGN PATENT DOCUMENTS

DE 102016102049 8/2017
DE 102016102049 A1 * 8/2017 ................ F02C 7/12
(Continued)

OTHER PUBLICATIONS

European Patent Office, European Search Report dated May 16, 2019 in Application No. 18204881.9.

*Primary Examiner* — Aaron R Eastman
*Assistant Examiner* — Theodore C Ribadeneyra
(74) *Attorney, Agent, or Firm* — Snell & Wilmer L.L.P.

(57) ABSTRACT

A gas turbine engine is disclosed. The gas turbine engine includes a first rotor supporting a first plurality of circumferentially spaced rotor blades and a second rotor disposed axially downstream of the first rotor and supporting a second plurality of circumferentially spaced rotor blades, a first bore cavity between the first rotor and the second rotor, a first fluid passageway configured to provide cooled air to the first bore cavity and a first anti-vortex component positioned proximate the first bore cavity and configured to increase pressure of the cooled air as the cooled air traverses radially outward from the first bore cavity.

18 Claims, 3 Drawing Sheets

(51) Int. Cl.

| | |
|---|---|
| ***F02C 7/18*** | (2006.01) |
| ***F02C 7/141*** | (2006.01) |
| *F04D 29/58* | (2006.01) |
| *F04D 29/32* | (2006.01) |
| *F01D 11/02* | (2006.01) |
| *F01D 11/00* | (2006.01) |

(52) U.S. Cl.

CPC ................ *F05D 2220/3218* (2013.01); *F05D 2220/3219* (2013.01); *F05D 2240/11* (2013.01); *F05D 2240/12* (2013.01); *F05D 2240/24* (2013.01); *F05D 2240/55* (2013.01); *F05D 2260/20* (2013.01); *F05D 2260/209* (2013.01); *F05D 2260/213* (2013.01)

(56) References Cited

U.S. PATENT DOCUMENTS

| | | | | |
|---|---|---|---|---|
| 6,390,771 | B1 * | 5/2002 | Gervais | F01D 11/18 415/139 |
| 6,981,841 | B2 | 1/2006 | Krammer et al. | |
| 7,159,402 | B2 * | 1/2007 | Hein | F01D 5/081 415/115 |
| 7,448,221 | B2 * | 11/2008 | Suciu | F01D 5/066 415/141 |
| 7,870,742 | B2 * | 1/2011 | Lee | F01D 5/082 60/782 |
| 8,056,345 | B2 * | 11/2011 | Norris | F02C 7/14 60/736 |
| 8,250,870 | B2 * | 8/2012 | Hein | F01D 5/081 415/115 |
| 8,453,463 | B2 * | 6/2013 | Grewal | F01D 5/08 415/115 |
| 8,465,252 | B2 * | 6/2013 | Bintz | F01D 5/087 415/115 |
| 8,858,161 | B1 * | 10/2014 | Ryznic | F02C 7/143 415/1 |
| 9,091,172 | B2 | 7/2015 | Wolfgram et al. | |
| 9,188,009 | B2 | 11/2015 | Yilmaz et al. | |
| 9,234,463 | B2 | 1/2016 | Benjamin et al. | |
| 9,816,963 | B2 | 11/2017 | Vetters et al. | |
| 2011/0129332 | A1 * | 6/2011 | Behaghel | F01D 9/065 415/68 |
| 2013/0025290 | A1 * | 1/2013 | Glahn | F01D 5/081 60/772 |
| 2013/0192253 | A1 * | 8/2013 | Ackermann | F01D 5/085 60/782 |
| 2013/0323010 | A1 * | 12/2013 | Mosley | F01D 5/082 415/1 |
| 2014/0105732 | A1 * | 4/2014 | Luneau | F01D 11/001 415/174.4 |
| 2014/0334920 | A1 * | 11/2014 | Cortequisse | F04D 29/161 415/173.4 |
| 2014/0348633 | A1 * | 11/2014 | Boeck | F01D 11/10 415/1 |
| 2016/0076378 | A1 | 3/2016 | Bintz et al. | |
| 2016/0076379 | A1 * | 3/2016 | Forcier | F01D 5/081 416/1 |
| 2016/0123234 | A1 * | 5/2016 | Forcier | F01D 5/087 60/805 |
| 2016/0326887 | A1 | 11/2016 | Waite et al. | |
| 2017/0167264 | A1 * | 6/2017 | Sicard | F01D 5/081 |
| 2017/0226861 | A1 * | 8/2017 | Evain | F04D 29/522 |
| 2017/0234133 | A1 * | 8/2017 | Prescott | F01D 5/10 416/1 |
| 2017/0292532 | A1 * | 10/2017 | Wall | F04D 29/582 |
| 2017/0328227 | A1 * | 11/2017 | Quelven | F01D 5/082 |
| 2018/0163740 | A1 * | 6/2018 | Scholtes | F04D 29/083 |
| 2018/0209299 | A1 * | 7/2018 | Johnson | F01D 25/12 |
| 2018/0209300 | A1 * | 7/2018 | Johnson | F01D 9/065 |

FOREIGN PATENT DOCUMENTS

| | | |
|---|---|---|
| EP | 3018288 | 5/2016 |
| GB | 836952 | 6/1960 |

* cited by examiner

RADIAL COOLING SYSTEM FOR GAS TURBINE ENGINE COMPRESSORS

GOVERNMENT LICENSE RIGHTS

This disclosure was made with government support under contract FA8650-15-D-2502-0002, awarded by the United Stated Air Force. The government has certain rights in the disclosure.

FIELD

The present disclosure relates to gas turbine engines and, more particularly, to thermal management systems used in gas turbine engine compressors.

BACKGROUND

Gas turbine engines typically include a compressor section, a combustor section and a turbine section. During operation, air is pressurized in the compressor section and mixed with fuel and burned in the combustor section to generate hot combustion gases. The hot combustion gases are communicated through the turbine section, which extracts energy from the hot combustion gases to power the compressor section and other loads occurring within a gas turbine engine. Performance and efficiency improvements in gas turbine engine architectures are often accompanied by increases in compressor exit discharge temperatures, which are approaching the limits of material capabilities.

SUMMARY

A method and apparatus for cooling engine componentry is disclosed, in which gas path air is extracted from a static flow path and introduced into a bore area or a compressor or turbine component of an engine. The method and apparatus is described below in the context of a gas turbine engine, though the principles are applicable to compressor or turbine components of engines in general. In accordance with various embodiments, a gas turbine engine includes a first rotor supporting a first plurality of circumferentially spaced rotor blades and a second rotor disposed axially downstream of the first rotor and supporting a second plurality of circumferentially spaced rotor blades. A first bore cavity exists between the first rotor and the second rotor. A first fluid passageway is configured to provide cooled air to the first bore cavity and a first anti-vortex component is positioned proximate the first bore cavity and configured to increase pressure of the cooled air as the cooled air traverses radially outward from the first bore cavity.

In various embodiments, a vane inner shroud is disposed radially outward of the first bore cavity and axially intermediate the first rotor and the second rotor. The vane inner shroud supports a plurality of circumferentially spaced vanes on a radially outer surface and has a sealing surface on a radially inner surface. The first plurality of circumferentially spaced rotor blades, the second plurality of circumferentially spaced rotor blades and the plurality of circumferentially spaced vanes define a portion of a core flow path.

A seal may be disposed between the radially inner surface of the vane inner shroud and the first bore cavity. The seal is configured to obstruct passage of air from the core flow path from an axially downstream position of the plurality of circumferentially spaced vanes to an axially upstream position of the plurality of circumferentially spaced vanes via a seal flow space between the seal and the radially inner surface of the vane inner shroud. A first gap is disposed downstream of the plurality of circumferentially spaced vanes that provides an inlet passage for air from the core flow path to flow between the seal and the radially inner surface of the vane inner shroud. A second gap is disposed upstream of the plurality of circumferentially spaced vanes that provides an exit passage for air between the seal and the radially inner surface of the vane inner shroud to return to the core flow path. A seal inlet is configured to introduce a cooled air flow path from the first bore cavity into the seal flow space. In various embodiments, the seal comprises a labyrinth seal having one or more knife edges.

The first anti-vortex component may comprise a first anti-vortex tube. The first fluid passageway may include a removal orifice extending into the core flow path at a removal location. The removal location may be positioned upstream of the first rotor. A heat exchanger may be positioned within the first fluid passageway intermediate the removal orifice and an inlet orifice positioned between the first rotor and the second rotor.

In various embodiments, a third rotor may be disposed axially downstream of the second rotor, supporting a third plurality of circumferentially spaced rotor blades. A second bore cavity may exist between the second rotor and the third rotor and a second fluid passageway may be configured to provide cooled air to the second bore cavity. A second anti-vortex component may be positioned proximate the second bore cavity and configured to increase pressure of the cooled air as the cooled air traverses radially outward from the second bore cavity. In various embodiments, the first anti-vortex component comprises a first anti-vortex tube and the second anti-vortex component comprises a second anti-vortex tube. The first anti-vortex tube may have a first length and the second anti-vortex tube may have a second length greater than the first length.

A compressor for a gas turbine engine is disclosed. In various embodiments, the compressor includes a first rotor supporting a first plurality of circumferentially spaced rotor blades, a second rotor disposed axially downstream of the first rotor and supporting a second plurality of circumferentially spaced rotor blades and a third rotor disposed axially downstream of the second rotor and supporting a third plurality of circumferentially spaced rotor blades. A first bore cavity resides between the first rotor and the second rotor and a second bore cavity resides between the second rotor and the third rotor. A fluid passageway is configured to provide cooled air to the first bore cavity and the second bore cavity. A first anti-vortex component is positioned proximate the first bore cavity and configured to increase pressure of the cooled air as the cooled air traverses radially outward from the first bore cavity and a second anti-vortex component is positioned proximate the second bore cavity and configured to increase pressure of the cooled air as the cooled air traverses radially outward from the second bore cavity.

In various embodiments, a first vane inner shroud is disposed radially outward of the first bore cavity and axially intermediate the first rotor and the second rotor. The first vane inner shroud supports a first plurality of circumferentially spaced vanes on a first radially outer surface and has a first sealing surface on a first radially inner surface. A second vane inner shroud is disposed radially outward of the second bore cavity and axially intermediate the second rotor and the third rotor. The second vane inner shroud supports a second plurality of circumferentially spaced vanes on a second radially outer surface and has a second sealing surface on a second radially inner surface. The first plurality of circumferentially spaced rotor blades, the second plurality of circumferentially spaced rotor blades and the third plurality of circumferentially spaced rotor blades, and the first plurality of circumferentially spaced vanes and the second plurality of circumferentially spaced vanes define a portion of a core flow path.

In various embodiments, a first seal is disposed between the first radially inner surface of the first vane inner shroud and the first bore cavity, the first seal configured to obstruct passage of air from the core flow path from an axially downstream position of the first plurality of circumferentially spaced vanes to an axially upstream position of the first plurality of circumferentially spaced vanes via a first seal flow space between the first seal and the first radially inner surface of the first vane inner shroud. A second seal is disposed between the second radially inner surface of the second vane inner shroud and the second bore cavity, the second seal configured to obstruct passage of air from the core flow path from an axially downstream position of the second plurality of circumferentially spaced vanes to an axially upstream position of the second plurality of circumferentially spaced vanes via a second seal flow space between the second seal and the second radially inner surface of the second vane inner shroud. A first seal inlet is configured to introduce a first cooled air flow path from the first bore cavity into the first seal flow space and a second seal inlet is configured to introduce a second cooled air flow path from the second bore cavity into the second seal flow space.

In various embodiments, the first anti-vortex component comprises a first anti-vortex tube and the second anti-vortex component comprises a second anti-vortex tube. A third anti-vortex tube may be positioned within a third bore cavity, in fluid communication with the fluid passageway and positioned downstream of the third rotor. The third anti-vortex tube may be configured to increase pressure of the cooled air as the cooled air traverses radially outward from the third bore cavity. A rim inlet may be configured to introduce a third cooled air flow path from the third bore cavity into a rim portion of the third rotor. In various embodiments, a heat exchanger is positioned within the fluid passageway.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
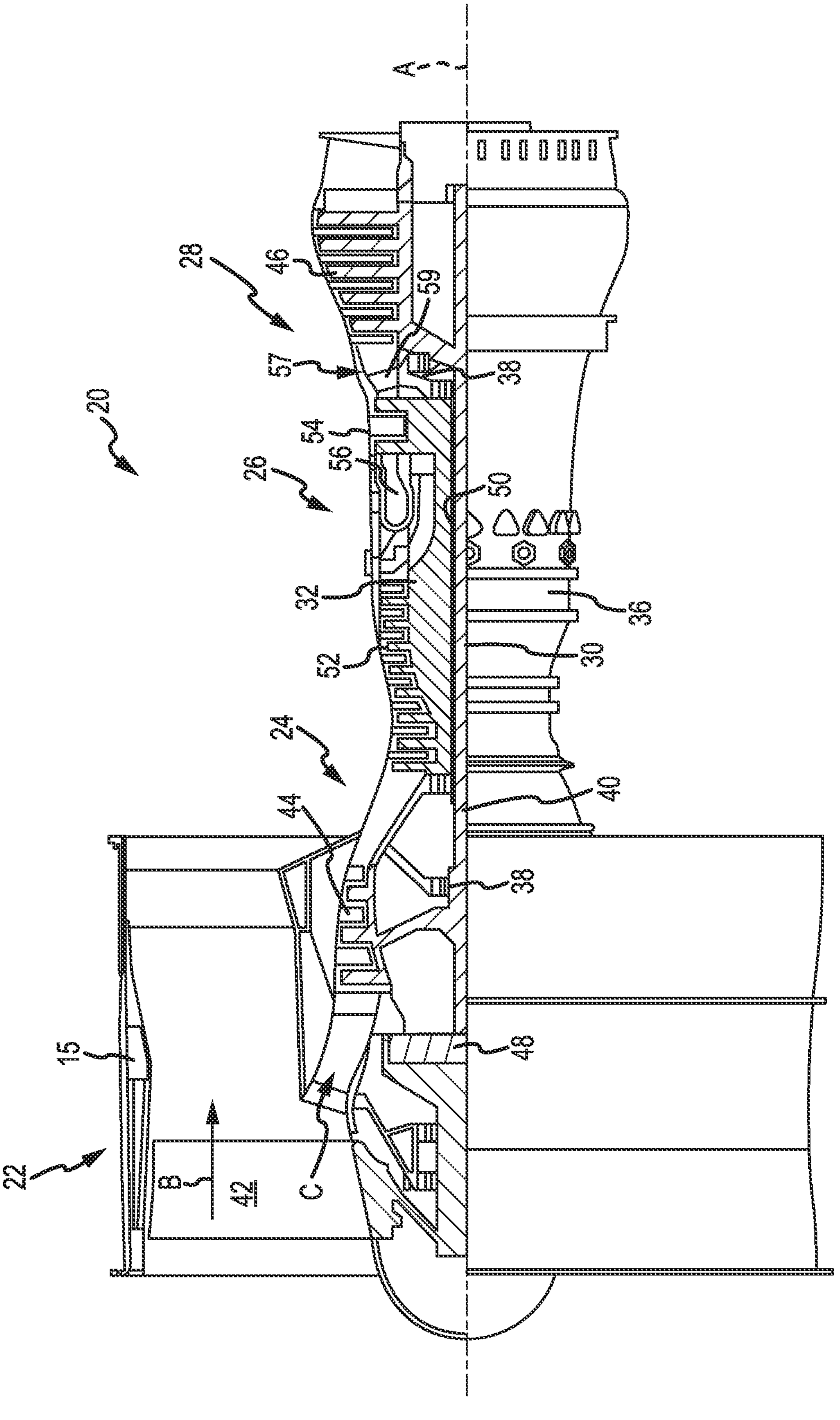
FIG. 1 is a schematic view of a gas turbine engine, in accordance with various embodiments.

Referring now to the drawings, FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a primary or core flow path C for compression and communication into the combustor section 26 and then expansion through the turbine section 28. Although depicted as a two-spool turbofan gas turbine engine in the disclosed non-limiting embodiment, it will be understood that the concepts described herein are not limited to use with two-spool turbofans as the teachings may be applied to other types of turbine engines, including three-spool architectures.

The gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided and the location of the bearing systems 38 may be varied as appropriate to the application. The low speed spool 30 generally includes an inner shaft 40 that interconnects a fan 42, a low pressure compressor 44 and a low pressure turbine 46. The inner shaft 40 is connected to the fan 42 through a speed change mechanism, which in this gas turbine engine 20 is illustrated as a geared architecture 48 to drive the fan 42 at a lower speed than the low speed spool 30. The high speed spool 32 includes an outer shaft 50 that interconnects a high pressure compressor 52 and a high pressure turbine 54. A combustor 56 is arranged in the gas turbine engine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via the bearing systems 38 about the engine central longitudinal axis A, which is collinear with their longitudinal axes.

The air in the core flow path is compressed by the low pressure compressor 44 and then the high pressure compressor 52, mixed and burned with fuel in the combustor 56, and then expanded over the high pressure turbine 54 and low pressure turbine 46. The mid-turbine frame 57 includes airfoils 59 that are in the core flow path C. The low pressure turbine 46 and the high pressure turbine 54 rotationally drive the respective low speed spool 30 and the high speed spool 32 in response to the expansion. It will be appreciated that each of the positions of the fan section 22, compressor section 24, combustor section 26, turbine section 28, and fan drive gear system 48 may be varied. For example, the gear system 48 may be located aft of the combustor section 26 or even aft of the turbine section 28, and the fan section 22 may be positioned forward or aft of the location of the gear system 48.

Figure 2B:
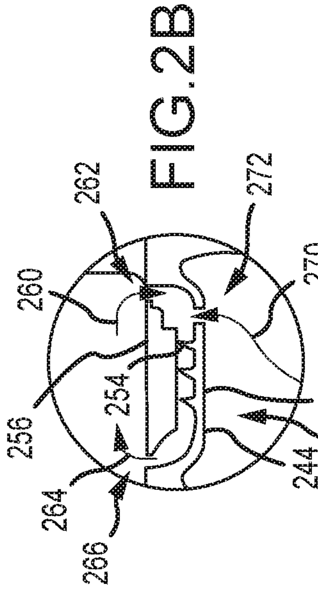
FIGS. 2A and 2B are schematic views of a high-pressure compressor section of a gas turbine engine, according to various embodiments.
Figure 2A:
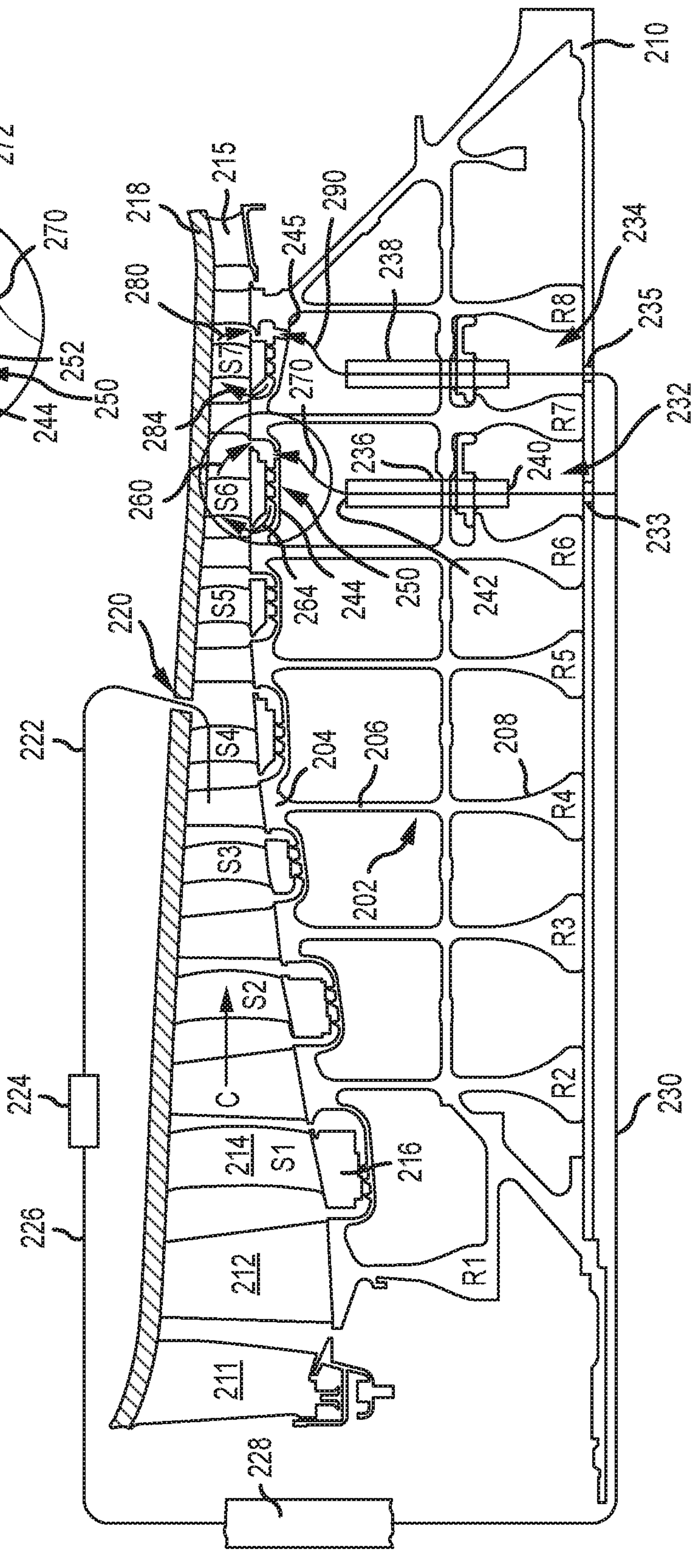

Referring now to FIG. 2A, a section of a compressor is illustrated, according to various embodiments, such as a high pressure compressor 200 of a gas turbine engine. The high pressure compressor 200 includes a plurality of rotors 202 (e.g., R1-R8), each having a rim 204, a disk 206 and a bore 208. In various embodiments, the rotors 202 are disposed on a high speed spool 210 configured to rotate about a central longitudinal axis. A plurality of rotor blades 212 is secured to the rim 204 of each of the plurality of rotors 202, while a plurality of vanes 214 is disposed between the rotor blades 212 disposed on adjacent pairs of rotors 202. A vane inner shroud 216 is positioned radially inward of each of each plurality of vanes 214. A plurality of stators (e.g., S1-S7) is formed by each plurality of vanes 214 and its corresponding vane inner shroud 216. An alternating series of vane inner shroud 216 sections and rim 204 sections forms an inner diameter of a core flow path C. An outer casing 218 forms an outer diameter of the core flow path C. In various embodiments, the outer casing 218, together with each of the vanes 214 and vane inner shroud 216 sections, form a stationary structure, while the plurality of rotors 202 and rotor blades 212 form a rotating structure. In various embodiments, the high pressure compressor may further include a plurality of inlet guide vanes 211 positioned upstream of rotor R1 and a plurality of exit guide vanes 215, positioned downstream of rotor R8. Air in the core flow path C traverses from left to right in FIG. 2A and increases in pressure and temperature at each stage of the high pressure compressor 200.

In various embodiments, air is bled from the core flow path C from a first bleed slot 220 disposed in the outer casing 218. The air is routed by a first passage 222 into a heat exchanger 224. While a single bleed slot and passage is shown in the sectional illustration, a plurality of bleed slots and passages, circumferentially disposed about the outer casing 218, may be employed to route air bled from the core flow path C through one or more heat exchangers. The heat exchanger 224 may be positioned within a bypass flow path or configured to receive a cooling fluid from another available source to reduce the temperature of the air bled from the first bleed slot 220. The air exits the heat exchanger 224 at a lower temperature than upon entry and is routed, in various embodiments, by a second passage 226 into an intermediate casing 228 located upstream of the high pressure compressor 200. The intermediate casing 228 may form part of the stationary structure of a gas turbine engine. The air is then routed via a third passage 230 into one or more bore cavities, such as a first bore cavity 232, located between rotors R6 and R7, and a second bore cavity 234, located between rotors R7 and R8. In various embodiments, the third passage 230 may be formed within a hollow interior of the high speed spool 210. In various embodiments, the air may flow from the third passage 230 into the first bore cavity 232 via a first orifice 233 extending through the high speed spool 210 (there may be several such orifices positioned circumferentially about the spool). Similarly, the air may flow from the third passage 230 into the second bore cavity 234 via a second orifice 235 extending through the high speed spool 210 (there may be several such orifices positioned circumferentially about the spool).

Once in the bore cavities, such as the first bore cavity 232 or the second bore cavity 234, the flow of bleed air is routed through or past one or more flow structures attached between rotor stages. The flow structures may take the form of tubes, vanes or ribs that act to increase the gradient of pressure from the bore cavity to an outer drum diameter of the rotating structure, such that the pressure near the outer drum diameter is greater than the pressure in the bore cavity. In various embodiments, the flow structures may include anti-vortex features, such as paddles attached to a side of a disk or as, for example, a bolted flange on a disk with radial or angled slots cut into the flange so the combination of the flange with the slots and the disk surface form tube-like passages that act to increase the pressure of the fluid flowing radially outward of the passages. In various embodiments, the flow structures take the form of anti-vortex tubes, such as a first anti-vortex tube 236, located between rotors R6 and R7, and a second anti-vortex tube 238, located between rotors R7 and R8. For example, air entering the first bore cavity 232 enters through an inlet 240 of the first anti-vortex tube 236. As the first anti-vortex tube 236 rotates with the rotating structure formed by rotors R6 and R7, the air flows along the length of the tube, exits through an outlet 242 of the first anti-vortex tube 236 and then flows radially outward toward an inner diameter 244 of the rotating structure formed by the rotors R6 and R7. An effect of passing the air through the first anti-vortex tube 236 and then radially outward toward the inner diameter 244 of the rotating structure is to increase the pressure of the air above that of the air exiting the first bleed slot 220 and entering the first bore cavity 232.

Referring now to FIGS. 2A and 2B, the cooled air flowing near the inner diameter 244 of the rotating structure is illustrated as cooling a seal structure 250 of the high pressure compressor 200. In various embodiments, the seal structure 250 includes a labyrinth seal 252 having one or more knife edges 254 extending radially outward toward a radially inner surface of a first vane inner shroud 256. During typical operation, air downstream of stator S6 will be at a higher pressure than air upstream of stator S6. The pressure difference results in a recirculation path of hot air flowing past the knife edges 254. For example, high pressure air in the core flow path C downstream of stator S6 will establish a first flow path 260 of high pressure and high temperature air entering the seal structure 250 via a first gap 262 downstream of stator S6. The air in the first flow path 260 will flow past the knife edges 254 and exit the seal structure 250 as a second flow path 264 through a second gap 266 upstream of stator S6 and be reintroduced into the core flow path C.

To reduce a potential for low cycle and thermal-mechanical fatigue of the disks (e.g., R6 and R7), particularly the rim regions of the disks, and the seal structure 250 and the knife edges 254 of the seal structure 250 caused by the flow of high temperature air in the first flow path 260, a cooled air flow path 270 is introduced into the seal structure 250 via a seal inlet orifice 272 (there may be several such orifices positioned circumferentially about the seal). Introduction of the cooled air flow path 270 reduces thermal gradients within the disks, primarily in the rim regions of the disks, and within the seal structure 250 and the knife edges 254 of the seal structure 250. The pressure of the air in the cooled air flow path 270 is higher than the pressure of the air in the first flow path 260 as a result of pressure increase resulting from passing the cooling air through the first anti-vortex tube 236 and then radially outward toward the inner diameter 244 of the rotating structure. The mixing of the high temperature air in the first flow path 260 with the cooler temperature air in the cooled air flow path 270 results in a net cooler temperature of the air bathing the seal structure 250, the knife edges 254 of the seal structure 250 and the radially inner surface of a first vane inner shroud 256. The inner diameter 244 of the rotating structure is similarly cooled by the cooler air before it enters the cooled air flow path 270.

In similar manner as that described above, air entering the second bore cavity 234 enters through an inlet of the second anti-vortex tube 238. As the second anti-vortex tube 238 rotates with the rotating structure formed by rotors R7 and R8, the air flows along the length of the tube, exits through an outlet and then flows radially outward toward a second inner diameter 245 of the rotating structure formed by the rotors R7 and R8. The air flowing radially outward toward the second inner diameter 245 of the rotating structure reaches a pressure above that of the air exiting the first bleed slot 220 and entering the second bore cavity 234. High pressure air in the core flow path C downstream of stator S7 will establish a first flow path 280 of high pressure and high temperature air entering the corresponding seal structure via a first gap downstream of stator S7. The air in the first flow path 280 will flow past the knife edges and exit the seal structure as a second flow path 284 through a second gap upstream of stator S7 and be reintroduced into the core flow path C. A cooled air flow path 290 is introduced into the seal structure via a seal inlet orifice similar to that described above. The pressure of the air in the cooled air flow path 290 is higher than the pressure of the air in the first flow path 280 as a result of pressure increase resulting from passing the cooling air through the second anti-vortex tube 238 and then radially outward toward the second inner diameter 245 of the rotating structure. The mixing of the high temperature air in the first flow path 280 with the cooler temperature air in the cooled air flow path 290 results in a net cooler temperature of the air bathing the corresponding seal structure, the knife edges of the seal structure and the radially inner surface of a corresponding vane inner shroud. The second inner diameter 245 of the rotating structure is similarly cooled by the cooler air before it enters the cooled air flow path 290.

Figure 3:
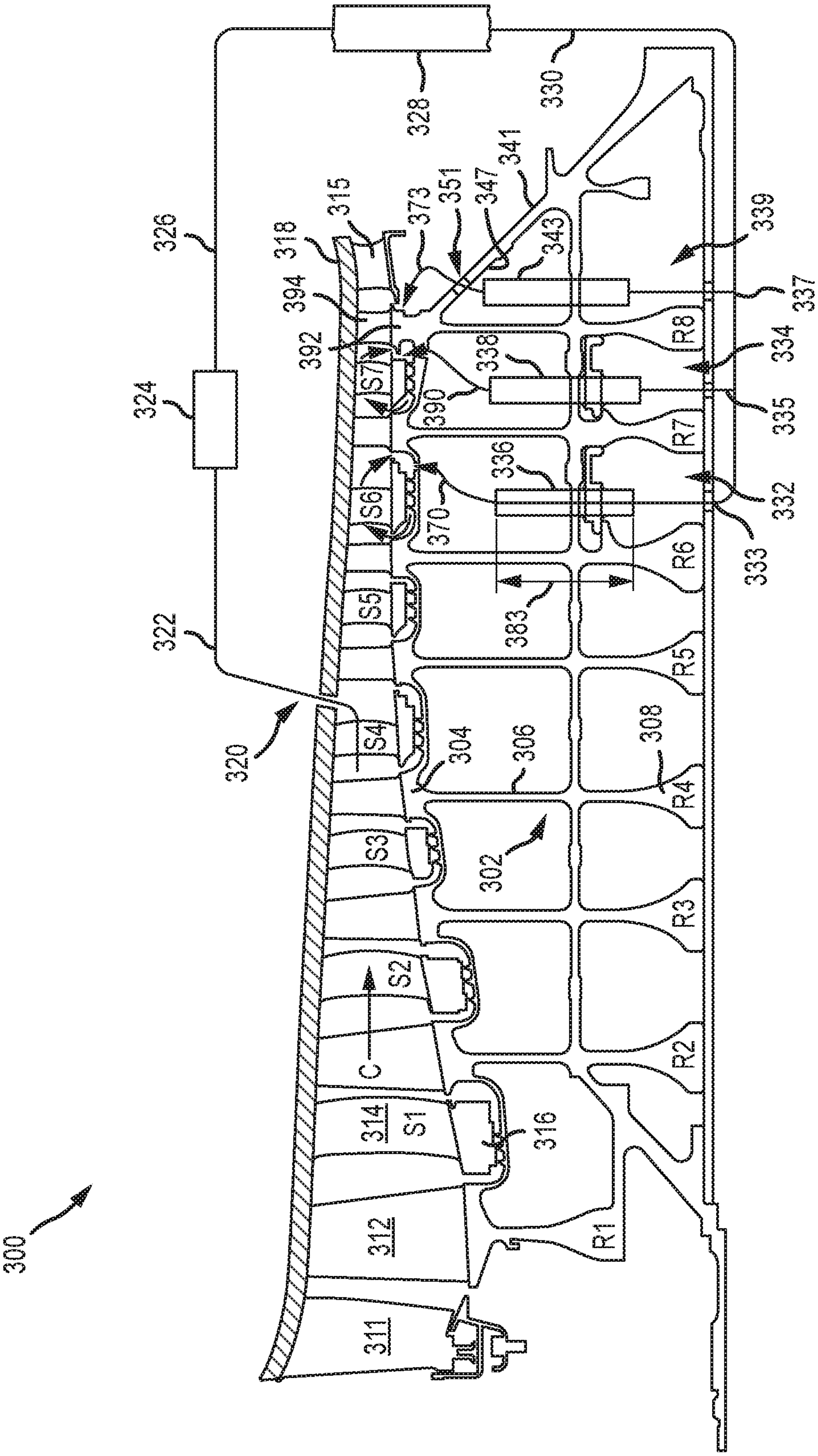
FIG. 3 is a schematic view of a high-pressure compressor section of a gas turbine engine, according to various embodiments.

Referring now to FIG. 3, a section of a compressor is illustrated, according to various embodiments, such as a high pressure compressor 300 of a gas turbine engine. The high pressure compressor 300 includes a plurality of rotors 302 (e.g., R1-R8), each having a rim 304, a disk 306 and a bore 308. In various embodiments, the rotors 302 are disposed on a high speed spool 310 configured to rotate about a central longitudinal axis. A plurality of rotor blades 312 is secured to the rim 304 of each of the plurality of rotors 302, while a plurality of vanes 314 is disposed between the rotor blades 312 disposed on adjacent pairs of rotors 302. A vane inner shroud 316 is positioned radially inward of each of each plurality of vanes 314. A plurality of stators (e.g., S1-S7) is formed by each plurality of vanes 314 and its corresponding vane inner shroud 316. An alternating series of vane inner shroud 316 sections and rim 304 sections forms an inner diameter of a core flow path C. An outer casing 318 forms an outer diameter of the core flow path C.

In various embodiments, the outer casing 318, together with each of the vanes 314 and vane inner shroud 316 sections, form a stationary structure, while the plurality of rotors 302 and rotor blades 312 form a rotating structure. In various embodiments, the high pressure compressor may further include a plurality of inlet guide vanes 311 positioned upstream of rotor R1 and a plurality of exit guide vanes 315, positioned downstream of rotor R8. Air in the core flow path C traverses from left to right in FIG. 3 and increases in pressure and temperature at each stage of the high pressure compressor 300.

In various embodiments, air is bled from the core flow path C from a first bleed slot 320 disposed in the outer casing 318. The air is routed by a first passage 322 into a heat exchanger 324. While a single bleed slot and passage is shown in the sectional illustration, a plurality of bleed slots and passages, circumferentially disposed about the outer casing 318, may be employed to route air bled from the core flow path C through one or more heat exchangers. The heat exchanger 324 may be positioned within a bypass flow path or configured to receive a cooling fluid from another available source to reduce the temperature of the air bled from the first bleed slot 320. The air exits the heat exchanger 324 at a lower temperature than upon entry and is routed, in various embodiments, by a second passage 326 into an aft casing 328 located downstream of the high pressure compressor 300. The aft casing 328 may form part of the stationary structure of a gas turbine engine. The air is then routed via a third passage 330 into one or more bore cavities, such as a first bore cavity 332, located between rotors R6 and R7, a second bore cavity 334, located between rotors R7 and R8 and a third bore cavity 339, located between rotor R8 and an aft hub 341. In various embodiments, the third passage 330 may be formed within a hollow interior of the high speed spool 310. In various embodiments, the air may flow from the third passage 330 into the first bore cavity 332 via a first orifice 333 extending through the high speed spool 310 (there may be several such orifices positioned circumferentially about the spool). Similarly, the air may flow from the third passage 330 into the second bore cavity 334 via a second orifice 335 and into the third bore cavity 339 via a third orifice 337, with both the second orifice 335 and the third orifice 337 extending through the high speed spool 310 (there may be several such orifices positioned circumferentially about the spool).

Once in the bore cavities, such as the first bore cavity 332, the second bore cavity 334 or the third bore cavity 339, the flow of bleed air is routed through or past one or more flow structures attached between rotor stages. The flow structures may take the form of tubes, vanes or ribs that act to increase the gradient of pressure from the bore cavity to an outer drum diameter of the rotating structure, such that the pressure near the outer drum diameter is greater than the pressure in the bore cavity. In various embodiments, the flow structures take the form of anti-vortex tubes, such as a first anti-vortex tube 336, located between rotors R6 and R7, a second anti-vortex tube 338, located between rotors R7 and R8 and a third anti-vortex tube 343 located between rotor R8 and the aft hub 341. The dynamics of the flow of cooling air passing through the first anti-vortex tube 336 and the second anti-vortex tube 338 and into corresponding seals to cool the high-temperature air from the core flow path C circulating about the corresponding seals is similar to that described above with reference to FIGS. 2A and 2B. Air entering the third bore cavity 339 enters through an inlet of the third anti-vortex tube 343, exits through an outlet and then flows radially outward toward an inner surface 347 of the aft hub

341. A third cooled air flow path 373 then carries cooled air through an orifice 351 in the aft hub 341 to a rim 392 of rotor R8. The rim 392 or rotor blades 394 secured to the rim 391 may then be cooled using air from the third cooled air flow path 373.

In various embodiments, each of the anti-vortex tubes has a length and a diameter that may be sized for the specific application and operating parameters. For example, the first anti-vortex tube 336 may have a length 383 that is shorter or greater than the lengths of the second anti-vortex tube 338 and the third anti-vortex tube 343. A vortex-tube with a longer length may yield a higher pressure at the outlet, all else being equal. In various embodiments, the length 383 of the first anti-vortex tube 336 has a value equal to L, while the lengths of the second anti-vortex tube 338 and the third anti-vortex tube 343 may be greater than or less than L. In various embodiments, the anti-vortex tubes will become progressively longer in the more rearward stages as the tubes are required to exit cooling air in regions of progressively higher pressure. For example, additional lengths of the second anti-vortex tube 338 and the third anti-vortex tube 343 will yield higher pressures at the respective outlets, which may be used to offset the increasing pressure in the core flow path as the air passes each successive stage. Thus, for example, an addition in the length of the second anti-vortex tube 338 compared with the length 383 of the first anti-vortex tube 336 may facilitate offsetting the higher pressure expected downstream of stator S7 as compared to the pressure downstream of stator S6 as cooling air is routed to these locations through a second cooled air flow path 390 and a first cooled air flow path 370, respectively, as described above with reference to FIGS. 2A and 2B.

In various embodiments, any number of bore cavities comprises an anti-vortex component (or pump-like device), such as an anti-vortex tube, or a plurality of anti-vortex components. The lengths of each of the anti-vortex tubes in any of the bore cavities may be varied, essentially from about 0% to about 100% of the radial length of the bore cavity. Varying the lengths of particular anti-vortex tubes facilitates decreasing or increasing pumping effectiveness (e.g., decreasing or increasing the pressure level at the tube outlet), thereby providing a conditioning or cooling flow to specific areas of the bore cavities and the rim seal cavities and components (e.g., the radially outermost portions of the bore cavities and the seal structures) as required for optimal performance. Similarly, in various embodiments, the diameters of each of the anti-vortex tubes may be varied with respect to other anti-vortex tubes within the system to facilitate adjustments to pumping effectiveness.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed:

1. A gas turbine engine, comprising:

a first rotor supporting a first plurality of circumferentially spaced rotor blades and a second rotor disposed axially downstream of the first rotor and supporting a second plurality of circumferentially spaced rotor blades;

a first bore cavity between the first rotor and the second rotor;

a second bore cavity between the second rotor and an aft hub;

a fluid passageway configured to provide a cooled air to the first bore cavity and to the second bore cavity;

a first anti-vortex component positioned within the first bore cavity and configured to increase pressure of the cooled air as the cooled air traverses radially outward from the first bore cavity;

a second anti-vortex component positioned within the second bore cavity and configured to increase pressure of the cooled air as the cooled air traverses radially outward from the second bore cavity; and an orifice through the aft hub configured to introduce an aft cooled air flow path from the second bore cavity onto a downstream rim portion of the second rotor, wherein the downstream rim portion of the second rotor is disposed axially upstream and adjacent a plurality of exit guide vanes.

2. The gas turbine engine of claim 1, further comprising a vane inner shroud disposed radially outward of the first bore cavity and axially intermediate the first rotor and the second rotor, the vane inner shroud supporting a plurality of circumferentially spaced vanes on a radially outer surface and having a sealing surface on a radially inner surface, the first plurality of circumferentially spaced rotor blades, the second plurality of circumferentially spaced rotor blades and the plurality of circumferentially spaced vanes defining a portion of a core flow path.

3. The gas turbine engine of claim 2, further comprising a seal disposed between the radially inner surface of the vane inner shroud and the first bore cavity, the seal configured to obstruct passage of air from the core flow path from an axially downstream position of the plurality of circumferentially spaced vanes to an axially upstream position of the plurality of circumferentially spaced vanes via a seal flow space between the seal and the radially inner surface of the vane inner shroud.

4. The gas turbine engine of claim 3, further comprising a first gap disposed downstream of the plurality of circumferentially spaced vanes that provides an inlet passage for air from the core flow path to flow between the seal and the radially inner surface of the vane inner shroud.

5. The gas turbine engine of claim 4, further comprising a second gap disposed upstream of the plurality of circumferentially spaced vanes that provides an exit passage for air between the seal and the radially inner surface of the vane inner shroud to return to the core flow path.

6. The gas turbine engine of claim 5, further comprising a seal inlet configured to introduce a cooled air flow path from the first bore cavity into the seal flow space.

7. The gas turbine engine of claim 6, wherein the seal comprises a labyrinth seal having one or more knife edges.

8. The gas turbine engine of claim 6, wherein the first anti-vortex component comprises a first anti-vortex tube.

9. The gas turbine engine of claim 6, wherein the fluid passageway includes a removal orifice extending into the core flow path at a removal location.

10. The gas turbine engine of claim 9, wherein the removal location is positioned upstream of the first rotor.

11. The gas turbine engine of claim 10, further comprising a heat exchanger positioned within the fluid passageway intermediate the removal orifice and an inlet orifice positioned between the first rotor and the second rotor.

12. The gas turbine engine of claim 11, wherein the first anti-vortex component comprises a first anti-vortex tube and the second anti-vortex component comprises a second anti-vortex tube.

13. The gas turbine engine of claim 12, wherein the first anti-vortex tube has a first length and the second anti-vortex tube has a second length greater than the first length.

14. A compressor for a gas turbine engine, comprising:

a first rotor supporting a first plurality of circumferentially spaced rotor blades, a second rotor disposed axially downstream of the first rotor and supporting a second plurality of circumferentially spaced rotor blades and a third rotor disposed axially downstream of the second rotor and supporting a third plurality of circumferentially spaced rotor blades;

a first bore cavity between the first rotor and the second rotor, a second bore cavity between the second rotor and the third rotor and a third bore cavity between the third rotor and an aft hub;

a fluid passageway configured to provide cooled air to the first bore cavity, the second bore cavity and the third bore cavity;

a first anti-vortex component positioned within the first bore cavity and configured to increase pressure of the cooled air as the cooled air traverses radially outward from the first bore cavity;

a second anti-vortex component positioned within the second bore cavity and configured to increase pressure of the cooled air as the cooled air traverses radially outward from the second bore cavity; and a third anti-vortex component positioned within the third bore cavity and configured to increase pressure of the cooled air as the cooled air traverses radially outward from the third bore cavity; and an orifice through the aft hub configured to introduce an aft cooled air flow path from the third bore cavity onto a downstream rim portion of the third rotor, wherein the downstream rim portion of the third rotor is disposed axially upstream and adjacent a plurality of exit guide vanes.

15. The compressor of claim 14, further comprising:

a first vane inner shroud disposed radially outward of the first bore cavity and axially intermediate the first rotor and the second rotor, the first vane inner shroud supporting a first plurality of circumferentially spaced vanes on a first radially outer surface and having a first sealing surface on a first radially inner surface, a second vane inner shroud disposed radially outward of the second bore cavity and axially intermediate the second rotor and the third rotor, the second vane inner shroud supporting a second plurality of circumferentially spaced vanes on a second radially outer surface and having a second sealing surface on a second radially inner surface, the first plurality of circumferentially spaced rotor blades, the second plurality of circumferentially spaced rotor blades and the third plurality of circumferentially spaced rotor blades, and the first plurality of circumferentially spaced vanes and the second plurality of circumferentially spaced vanes defining a portion of a core flow path.

16. The compressor of claim 15, further comprising:

a first seal disposed between the first radially inner surface of the first vane inner shroud and the first bore cavity, the first seal configured to obstruct passage of air from the core flow path from an axially downstream position of the first plurality of circumferentially spaced vanes to an axially upstream position of the first plurality of circumferentially spaced vanes via a first seal flow space between the first seal and the first radially inner surface of the first vane inner shroud and a second seal disposed between the second radially inner surface of the second vane inner shroud and the second bore cavity, the second seal configured to obstruct passage of air from the core flow path from an axially downstream position of the second plurality of circumferentially spaced vanes to an axially upstream position of the second plurality of circumferentially spaced vanes via a second seal flow space between the second seal and the second radially inner surface of the second vane inner shroud;

a first seal inlet configured to introduce a first cooled air flow path from the first bore cavity into the first seal flow space and a second seal inlet configured to introduce a second cooled air flow path from the second bore cavity into the second seal flow space.

17. The compressor of claim 16, wherein the first anti-vortex component comprises a first anti-vortex tube and the second anti-vortex component comprises a second anti-vortex tube.

18. The compressor of claim 16, further comprising a heat exchanger positioned within the fluid passageway.

* * * * *